(12) United States Patent
Vallart et al.

(10) Patent No.: US 10,556,678 B2
(45) Date of Patent: Feb. 11, 2020

(54) SYSTEM FOR CONTROLLING A ROTORCRAFT ROTOR, A ROTORCRAFT FITTED WITH SUCH A SYSTEM, AND AN ASSOCIATED CONTROL METHOD

(71) Applicant: AIRBUS HELICOPTERS, Marignane (FR)

(72) Inventors: Jean-Baptiste Vallart, Aix en Provence (FR); Romeo Byzery, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 554 days.

(21) Appl. No.: 15/298,530

(22) Filed: Oct. 20, 2016

(65) Prior Publication Data

US 2017/0113792 A1 Apr. 27, 2017

(30) Foreign Application Priority Data

Oct. 23, 2015 (FR) ..................... 15 02243

(51) Int. Cl.
*B64C 27/57* (2006.01)
*B64C 13/04* (2006.01)
(Continued)

(52) U.S. Cl.
CPC .......... *B64C 27/57* (2013.01); *B64C 13/0421* (2018.01); *B64C 27/68* (2013.01); *B60K 2026/022* (2013.01)

(58) Field of Classification Search
CPC .......... B64C 27/56; B64C 27/57; B64C 27/68
See application file for complete search history.

(56) References Cited

U.S. PATENT DOCUMENTS 8,568,096 B2 10/2013 Eglin
8,594,864 B2 11/2013 Greenfield et al.
(Continued)

FOREIGN PATENT DOCUMENTS

EP 2133768 12/2009
EP 2258616 12/2010
(Continued)

OTHER PUBLICATIONS

French Search Report for French Application No. FR 1502243, Completed by the French Patent Office, dated Jun. 27, 2016, 6 Pages.
(Continued)

*Primary Examiner* — Philip J Bonzell
*Assistant Examiner* — Tye William Abell
(74) *Attorney, Agent, or Firm* — Brooks Kushman P.C.

(57) ABSTRACT

A control system for controlling at least one rotor of a rotorcraft, the control system comprising at least one piloting member suitable for operating at least one control for controlling movements of the at least one rotor. Such a control system comprises: at least one memory enabling information representative of a predetermined control margin threshold to be stored; calculation means for calculating a current control margin, which margin is defined as being the difference between a current position and a limit of the control for controlling movements of the rotor(s); comparator means for comparing the current control margin with the predetermined control margin threshold; and a control unit for modifying an operating relationship of the control for controlling movements of the rotor(s) when the current control margin is less than or equal to the predetermined control margin.

20 Claims, 1 Drawing Sheet

(51) Int. Cl.
*B64C 27/68* (2006.01)
*B60K 26/02* (2006.01)

(56) References Cited

U.S. PATENT DOCUMENTS

| | | | |
|---|---|---|---|
| 2004/0010354 A1* | 1/2004 | Nicholas | B64C 27/56 701/4 |
| 2006/0071817 A1* | 4/2006 | Greene | B64C 27/57 340/965 |
| 2009/0229396 A1* | 9/2009 | Taylor | G05G 1/04 74/471 XY |
| 2009/0234518 A1* | 9/2009 | Irwin, III | B64C 13/345 701/4 |
| 2010/0310371 A1* | 12/2010 | Eglin | B64C 27/22 416/1 |
| 2011/0036940 A1* | 2/2011 | Shultz | B64C 27/56 244/17.11 |
| 2012/0153074 A1* | 6/2012 | Nannoni | B64C 27/57 244/17.13 |
| 2012/0286088 A1* | 11/2012 | Mercer | B64C 27/57 244/17.13 |
| 2013/0015289 A1* | 1/2013 | Fortenbaugh | B64C 27/57 244/17.13 |
| 2014/0027564 A1* | 1/2014 | Mercer | B64C 27/56 244/17.13 |
| 2014/0070048 A1* | 3/2014 | Dequin | B64D 43/00 244/17.13 |
| 2015/0175254 A1* | 6/2015 | Fortenbaugh | B64C 27/57 415/118 |
| 2015/0212523 A1* | 7/2015 | Wolf | B64D 47/00 701/5 |

FOREIGN PATENT DOCUMENTS

| | | |
|---|---|---|
| EP | 2457792 | 5/2012 |
| EP | 2497692 | 9/2012 |
| EP | 2821341 | 1/2015 |

OTHER PUBLICATIONS

Korean Notice of Preliminary Rejection dated Nov. 6, 2017, Application No. 10-2016-0136668, Applicant Airbus Helicopters, 2 Pages.

* cited by examiner

SYSTEM FOR CONTROLLING A ROTORCRAFT ROTOR, A ROTORCRAFT FITTED WITH SUCH A SYSTEM, AND AN ASSOCIATED CONTROL METHOD

CROSS REFERENCE TO RELATED APPLICATION

This application claims priority to French patent application No. FR 1502243 filed on Oct. 23, 2015, the disclosure of which is incorporated in its entirety by reference herein.

BACKGROUND OF THE INVENTION (1) Field of the Invention

The invention relates to a control system for controlling a rotorcraft rotor. Such a control system is adapted to enable the collective pitch and/or the cyclic pitch of the blades of a main rotor or of a tail rotor to be modified, and in particular to modify the angle of inclination of the plane of a main rotor as defined at each instant by the rotary motion of the free ends of the blades of the rotor. This angle of inclination serves to modify the direction of the lift force produced by a main rotor and consequently enables a rotorcraft to take up its various specific flight configurations.

The invention also relates to a rotorcraft fitted with such a rotor control system and to a method of controlling a rotor by means of a piloting member. In addition, below in the present application, the term "piloting member" is used to designate any control device suitable for being operated manually by a pilot or automatically, whether inside a cockpit or outside the rotorcraft, when the rotorcraft does not carry a pilot. Such a piloting member may have various forms and in particular it may be in the form of a cyclic pitch lever or a collective pitch stick for controlling the pitch of the blades of the rotor, i.e. the aerodynamic angle of incidence of the blades, or it may be a mini-stick or "joystick" for controlling the cyclic pitch or the collective pitch, or indeed it may be a set of pedals for modifying the pitch angle of the blades of a rotorcraft tail rotor.

(2) Description of Related Art

In conventional manner, rotorcraft control systems have piloting members with large lever arms and/or large amounts of travel between two physical abutments defining the travel stroke of a piloting member. Under certain circumstances, the stroke of the free end of a conventional collective pitch stick can be very large, and for example it may be more than several tens of centimeters.

Furthermore, with such conventional piloting members, it is usual practice to have a single piloting control that is proportional in position. Under such conditions, a position of the collective pitch stick corresponds always to the same position for the rotor plane of the rotorcraft, for example.

Such a mode of operation is used in particular when a mechanical control system or the piloting member and the rotor are connected together mechanically by a linkage made up of cranks, connecting rods, and swashplates.

Under such circumstances, a large amount of travel for the collective stick makes it possible to cover the entire control range of the rotor and enables the rotorcraft to be piloted with good sensitivity. For each movement of the collective pitch stick, there is a proportional movement of the members of the rotor and the resulting response of the rotorcraft is controllable.

Furthermore, the large amount of travel of the collective pitch stick also serves to provide a lever arm that is sufficient to counter large control forces.

Nevertheless, even with a large amount of travel, holding the stick in a determined position can be difficult to achieve or uncomfortable. That is why an assistance device, generally referred to as a "trim box", enables the pilot to place the collective pitch stick in a given position and leave it to means suitable for supplying a compensating force to hold the collective pitch stick in this position. In the jargon of rotorcraft piloting, this function is sometimes referred to as "anchoring the stick" or indeed "cancelling forces" (on the stick, understood).

Furthermore, in order to further limit the forces in the piloting member and improve piloting comfort, electrical or optical controls have subsequently been developed that enable the various movements of a rotor to be controlled. Under such circumstances, a computer receives information representative of a position of the collective pitch stick, of the cyclic pitch lever, or of the pedals, and in turn it controls at least one servo-control proportionally. The at least one servo-control thus enables the movements of the rotor to be controlled. Such an electrical or optical control system is thus advantageous in that it enables the piloting member to be decoupled mechanically from the rotor that it controls.

In addition, in order to simplify equipment, a piloting member, such as a joystick in particular, may also be passive. Under such circumstances, it does not have any motor means enabling its position to be further controlled. Such a joystick thus returns to its neutral force position if the pilot no longer exerts a position-holding force on it.

Nevertheless, under such circumstances, it can be difficult for the pilot to know whether the current position of a servo-control controlled by the joystick is close to a limit of its control range. Specifically, the piloting member may be positioned in a central position of its stroke, corresponding to a "force neutral" position, but this position may be completely decorrelated from the setpoint transmitted to the servo-control for controlling the movement of the rotor. Thus, the control associated with the current position of the servo-control, referred to in this application below more generally as the "control", may itself be close to a limit.

Furthermore, Document EP 2 258 616 describes a method and a system for controlling and regulating the drive of a hybrid helicopter. It also describes the possibility of limiting the propulsion of a rotor when the nose-down margin drops below a predefined threshold.

Nevertheless, in that Document EP 2 258 616, nothing indicates how the operating relationships for controlling propulsion is modified by a control unit.

Document EP 2 821 341 describes means for taking over the controls of an aircraft that was initially using an autopilot system.

Nevertheless, such a document does not describe modifying an operating relationship for the control of a rotor as a function of variation in a current control margin for controlling movements of a rotor.

Finally, Document EP 2 457 792 describes a vehicle piloting device that represents the technological background of the invention and that therefore does not make provision for modifying an operating relationship for controlling a rotor.

BRIEF SUMMARY OF THE INVENTION

An object of the present invention is thus to propose a control system enabling the above-mentioned criticisms to be overcome. The control system also improves the sensitivity of the control of movements of a rotorcraft rotor in the proximity of limits of such control over the movements of the rotor.

Another object of the invention is also to inform the pilot of the rotorcraft that there remains only a limited control margin, or in other words, that the pilot is close to limits on controlling movements of the rotor.

The invention thus relates to a control system for controlling a rotorcraft rotor. The control system also comprises at least one piloting member suitable for controlling at least one control for controlling movements of at least one rotor.

The control system comprises:

at least one memory enabling information representative of a predetermined control margin threshold to be stored;

calculation means for calculating a current control margin, which margin is defined as being the difference between a current position and a limit of the control for controlling movements of the rotor(s);

comparator means for comparing the current control margin with the predetermined control margin threshold; and a control unit for modifying an operating relationship of the control for controlling movements of the rotor(s) when the current control margin is less than or equal to the predetermined control margin.

In other words, the piloting member may be a collective pitch joystick or a cyclic pitch joystick, or indeed pedals, and it serves to operate a control such as a servo-control for controlling the movements of a rotorcraft rotor. The control may then serve for example to modify the angular orientation, i.e. the collective pitch and/or the cyclic pitch of the blades of a main rotor or of a tail rotor. Such a control may also serve to modify the angle of inclination of the plane of the rotor as defined at each instant by the rotary motion of the free ends of the blades of the rotor.

Specifically, controlling a rotor generally requires assistance to be provided by servo-controls that enable the pilot to pilot the rotorcraft accurately without using large amounts of force. In general manner, it is common practice to use there servo-controls, for example, in order to actuate a cyclic pitch swashplate of a main rotor, and in certain particular circumstances of a tail rotor. As a result, the rotorcraft can be controlled about all axes: roll, pitching, and yaw. It should be observed that a single servo-control may be used on a tail rotor insofar as providing a rotorcraft with yaw control does not make it essential to be able to control the cyclic pitch of the blades of that type of rotor.

Thus, in the application below, and for the purposes of simplifying understanding of the invention, it may be specified that the piloting member is suitable for operating a control or a servo-control for controlling the movements of a rotor, without thereby limiting the scope of the invention to this particular embodiment. Another embodiment covered by the present invention involves operating a plurality of controls with a single piloting member.

In addition, the calculation means, the comparator means, and the control unit may be formed by members that are distinct and separate from one another or they may be implemented in a single computer that performs those various functions, e.g. by using different algorithms.

Such a control system is remarkable in that when the current control margin is less than or equal to the predetermined control margin threshold, the control unit modifies a sensitivity of the operating relationship of the control for controlling movements of the rotor(s) so that a current position of the piloting member is made to be proportional to a current position of the control for controlling movements of the rotor(s).

Thus, when the current control margin is less than or equal to the predetermined margin threshold, the operating relationship for the servo-control is modified by the control unit to make the rotorcraft easier to pilot in this critical zone close to control limits. By way of example, this modification of the control relationship may serve to improve the sensitivity with which the piloting member operates the control when the current position of the control is close to one of its limits.

More particularly, the operating relational is adapted to establish a proportional relationship between the current position of the piloting member and the current position of a servo-control that is close to its limit. Such a proportional relationship is obtained by means of gain that is also referred to as the sensitivity of the operating relationship.

Adapting the operating relationship in this way serves in particular to provide control sensitivity that is suitable for providing fine control over the movements of the rotor(s) while it is coming close to the limit of the servo-control in question.

Furthermore, the control system may include a management unit for managing the piloting member. Such a management unit then enables the piloting member to be made inoperative for controlling movements of the rotor(s) when the current control margin is less than or equal to the predetermined control margin threshold, the piloting member then being inoperative over a predetermined range of positions of the piloting member, referred to as the "dead zone".

Thus, in such a dead zone, the positions of the piloting member do not lead to any variation in the current position of the servo-control in question, which is close to a limit. In addition, the dead zone is thus implemented by the management unit when the servo-control is close to a limit. Such a dead zone for application is then a function of the predetermined control margin threshold and it is selected so that the control is at its limit when the piloting member is likewise at a stroke abutment.

Furthermore, the control system may include warning means suitable for generating a perceptible signal enabling the pilot of the rotorcraft to be informed that the current control margin is less than or equal to the predetermined control margin threshold.

In this way, the pilot of the rotorcraft is warned as soon as at least one of the servo-controls controlling movements of the rotor(s) is close to a limit.

In practice, such a perceptible signal may be selected from the group comprising sound signals, luminous and/or visual signals, force signals opposing manual movement of the piloting member, and vibratory signals.

Naturally, such a perceptible signal may also consist in a combination of a plurality of signals such as sound signals, light signals, and vibratory signals, in particular.

In addition, the vibratory signals may be generated by a vibrator secured to the piloting member.

Under such circumstances, the servo-control crossing the predetermined margin threshold may be accompanied by vibration in the piloting member that is associated with controlling that control.

The invention also relates to a rotorcraft having at least one rotor providing the rotorcraft with lift and/or propulsion and also at least one piloting member suitable for operating at least one control for controlling movements of the rotor.

This rotorcraft includes a control system as described above. Thus, the rotorcraft of the invention includes a control system comprising:

at least one memory enabling information representative of a predetermined control margin threshold to be stored;

calculation means for calculating a current control margin, which margin is defined as being the difference between a current position and a limit of the control for controlling movements of the rotor(s);

comparator means for comparing the current control margin with the predetermined control margin threshold; and a control unit for modifying an operating relationship of the control for controlling movements of the rotor(s) when the current control margin is less than or equal to the predetermined control margin threshold, the control unit modifying a sensitivity of the operating relationship of the control for controlling movements of the rotor(s) so that a current position of the piloting member becomes proportional to a current position of the control for controlling movements of the rotor.

The present invention also provides a method of controlling at least one rotorcraft rotor by means of at least one piloting member suitable for controlling at least one control for controlling movements of the rotor(s).

Such a method comprises steps consisting in:

storing in a memory information representative of a predetermined control margin threshold;

calculating a current control margin defined as being the difference between a current position and a limit position of the control for controlling movements of the rotor(s);

comparing the current control margin with the predetermined control margin threshold; and modifying an operating relationship of the control for controlling movements of the rotor(s) when the current control margin is less than or equal to the predetermined control margin threshold.

Such a control method is remarkable in that the step consisting in modifying the operating relationship of the control for controlling movements of the rotor(s) enables a sensitivity of the operating relationship of the control to be modified so as to make a current position of the piloting member proportional to a current position of the control for controlling movements of the rotor.

In other words, the method enables the operating relationship of the servo-control to be adapted when the servo-control is close to a limit. Such adaptation of the operating relationship serves in particular to improve the accuracy and the fineness with which the rotorcraft is piloted on approaching this control limit.

More precisely, the step that consists in modifying the operating relationship of the servo-control may be performed by applying a proportionality coefficient, or "gain", between the current position of the piloting member and the current position of the servo-control.

Furthermore, the method may include a step consisting in making the piloting member inoperative over the control for controlling movements of the rotor(s) when the current control margin is less than or equal to the predetermined control margin threshold, the piloting member being inoperative over a predetermined range of positions of the piloting member.

Thus, the step consisting in making the piloting member inoperative may be implemented for example by inhibiting the control setpoint associated with the piloting member and by temporarily making the current position of the servo-control non-varying while the piloting member is in the position dead zone.

Furthermore, such a control method may include a step consisting in generating a perceptible signal enabling the pilot of the rotorcraft to be informed that the current control margin is less than or equal to the predetermined control margin threshold.

In this way, knowing that the current position of the servo-control is close to a limit, the pilot can adapt operation of the control for controlling movements of the rotor(s) and can thus act on the current position of the piloting member.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

DETAILED DESCRIPTION OF THE INVENTION

As mentioned above, the invention relates to a control system enabling at least one rotorcraft rotor to be controlled, and consequently enabling the associated rotorcraft to be controlled.

Elements present in more than one of the figures are given the same references in each of them.

Figure 1:
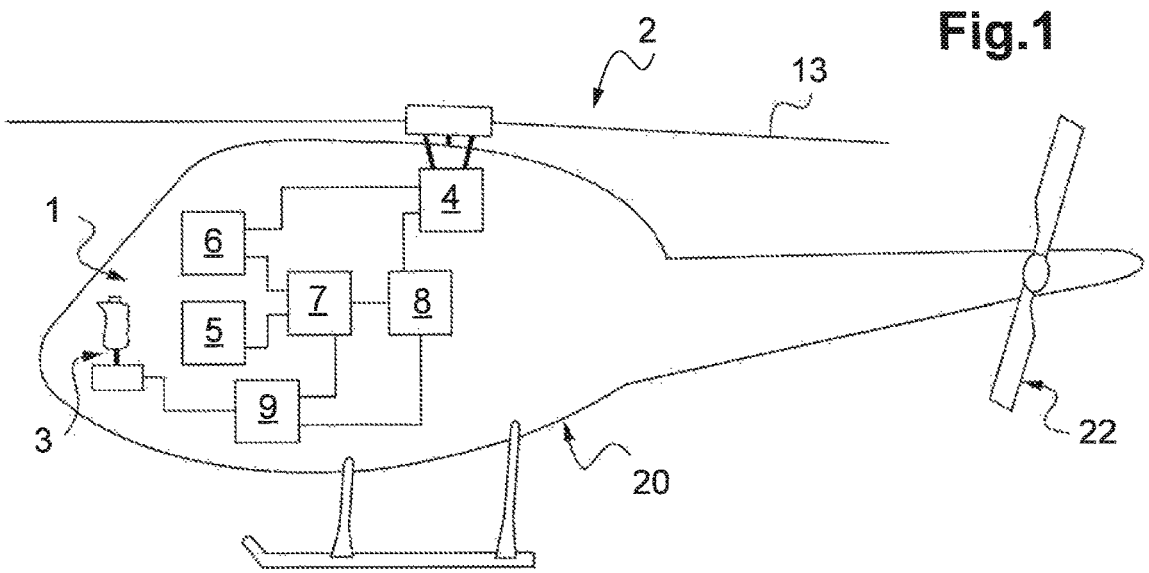
FIG. 1 is a diagram of a rotorcraft in accordance with the invention.

As shown in FIG. 1, such a rotorcraft 20 is thus provided with a control system 1 for operating a control 4 that controls movements of the rotor 2. In addition, such a control 4 may thus be in the form of a servo-control for modifying the angular orientation, i.e. the collective pitch and/or the cyclic pitch of the blade 23 of a main rotor 2 or of a tail rotor 22. Such a control 4 may also serve to modify the angle of inclination of the plane of the rotor 2 as defined at each instant by the rotary motion of the free ends of the blades 23 and the rotor 2.

Thus, the control system 1 includes a piloting member 3 that, as shown, is a joystick for being moved manually by the pilot of the rotorcraft 20, e.g. in order to operate the control 4 for controlling movements of at least one rotor 2 and/or 22. Consequently, in order to simplify the language of the present application and in preferred manner, the following detailed description of the invention relates to a control system 1 for controlling the movements of two rotors 2 and 22 simultaneously, but clearly without that limiting the scope of the invention to this particular embodiment.

The control system 1 also has a memory 5 for storing information representative of a predetermined control margin threshold. Such a control system 1 also has calculation means 6 for acting at regular time intervals to calculate a current control margin corresponding to the difference between a current position and a limit position of the control 4 for controlling movements of the rotors 2 and 22.

The control system 1 thus includes comparator means 7 for periodically comparing the current control margin with the predetermined control margin threshold.

Finally, such a control system 1 also has a control unit 8 serving to modify an operating relationship of the control 4 for controlling movements of the rotors 2 and 22 when the current control margin is calculated as being less than or equal to the predetermined control margin threshold.

Specifically, it is advantageous to adapt the operating relationship of the control 4 for controlling movements of the rotors 2 and 22 if the control 4 comes close to one of its limits. Such proximity with a limit of the control 4 can then be identified by comparison between the current control margin and the predetermined control margin threshold as stored in the memory 5.

In practice, the control unit 8 modifies the operating relationship by causing the current position of the control then to be proportional to a current position of the piloting member 3.

As shown, the control system 1 may also present a management unit 9 for managing the piloting member 3. Such a management unit 9 serves in particular to make the piloting member 3 inoperative over a predetermined range of positions of the piloting member 3. Such a predetermined range of positions is then referred to by the term "dead zone" since the control 4 is no longer modified so long as the piloting member 3 remains within the dead zone.

Figure 2:
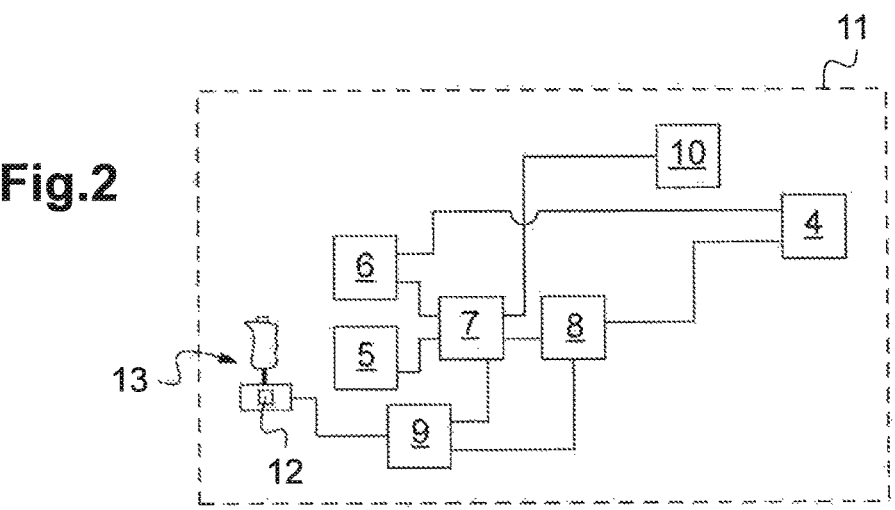
FIG. 2 is a diagram showing a control system in accordance with the invention.

In a variant of the invention as shown in FIG. 2, the control system 11 may also include warning means 10 to warn the pilot of the rotorcraft 20 if the control 4 is close to a limit.

Such warning means 10 thus enable a perceptible signal to be generated, which may for example be a sound signal, a visual signal, or resistance in the piloting member, or indeed vibration.

Thus, such a control system 11 may also include a piloting member 13 fitted with a vibrator 12 specifically to warn the pilot of the rotorcraft 20 that one of the controls for controlling movements of the rotor(s) is close to a limit.

Figure 3:
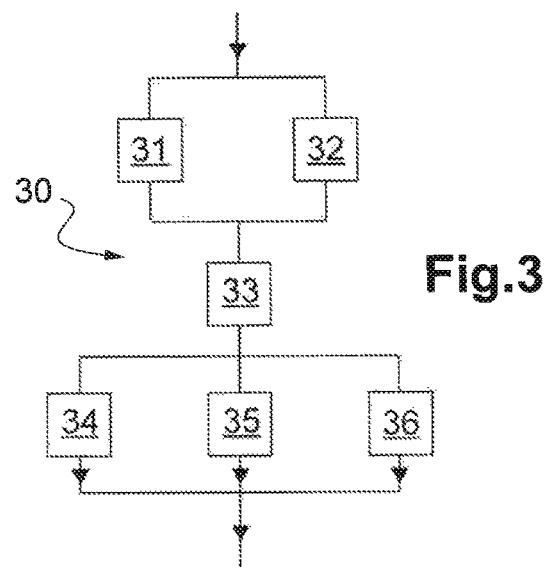
FIG. 3 is a flow chart of a control method in accordance with the invention.

As shown in FIG. 3, the invention also relates to a control method 30 for controlling the rotors 2 and 22 of a rotorcraft 20. Such a control method 30 is then performed in particular by means of a piloting member 3, 13 such as a mini-stick or a cyclic pitch lever, a collective pitch lever and pedals operated by a pilot of the rotorcraft 20.

Such a method 30 then comprises a plurality of steps as described below. Thus, the method 30 has a step 31 that consists in storing information representative of a predetermined control margin threshold in a memory 5.

The method 30 also has a step 32 that may for example be performed in parallel with the step 31 and that consists in calculating a current control margin, which is defined as being the difference between a current position and a limit of the control 4 for controlling movements of the rotors 2 and 22. The method 30 also has a step 33 consisting in comparing the current control margin with the predetermined control margin threshold.

Finally, the method 30 has a step 34 consisting in modifying the operating relationship of the control 4 for controlling movements of the rotors 2 and 22 when the current control margin is less than or equal to the predetermined control margin threshold.

In practice, such a step 34 consisting in modifying the operating relationship of the control 4 for controlling movements of the rotors 2 and 22 may consist more precisely in making the current position of the piloting member 3, 13 proportional to the current position of the control 4 for controlling the movements of the rotor 2 or of the rotor 22.

As shown, such a method 30 may also have a step 35 of making the piloting member 3, 13 inoperative on the control 4 for controlling movements of the rotors 2 and 22 when the current control margin is less than or equal to the predetermined control margin threshold. Under such circumstances, the piloting member 3, 13 is made inoperative over a predetermined range of positions of the piloting member 3, 13, referred to as the "dead zone".

Furthermore, the method 30 may also include a step 36 enabling a perceptible signal to be generated in order to inform the pilot of the rotorcraft 20 that the current control margin is less than or equal to said predetermined control margin threshold. The pilot of the rotorcraft 20 is then warned and can adapt the piloting of the rotorcraft 20 as a function of the proximity of the control limit.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A control system for controlling at least one rotor of a rotorcraft, the control system comprising at least one piloting member suitable for operating at least one control for controlling movements of the at least one rotor, and further comprising:
   at least one memory enabling information representative of a predetermined control margin threshold to be stored;
   calculation means for calculating a current control margin, which margin is defined as being the difference between a current position and a limit of the control for controlling movements of the at least one rotor;
   comparator means for comparing the current control margin with the predetermined control margin threshold; and
   a control unit for modifying an operating relationship of the control for controlling movements of the at least one rotor when the current control margin is less than or equal to the predetermined control margin threshold;
   wherein when the current control margin is less than or equal to the predetermined control margin threshold, the control unit modifies a sensitivity of the operating relationship of the control for controlling movements of the at least one rotor so that a current position of the piloting member is made to be proportional to a current position of the control for controlling movements of the at least one rotor;
   wherein the control system includes a management unit for managing the piloting member, the management unit enabling the piloting member to be made inoperative on the control for controlling movements of the at least one rotor when the current control margin is less than or equal to the predetermined control margin threshold, the piloting member being inoperative over a predetermined range of positions of the piloting member, referred to as a "dead zone".

2. A control system according to claim 1, wherein the piloting member comprises a control member suitable for being operated manually by a pilot.

3. A control system according to claim 1, wherein the piloting member comprises a joystick.

4. A control system according to claim 1, wherein the piloting member comprises a control device suitable for being operated automatically.

5. A control system according to claim 1, wherein the management unit renders the piloting member temporarily inoperative on the control for controlling movements of the at least one rotor when the current control margin is less than or equal to the predetermined control margin threshold, the piloting member being temporarily inoperative over the predetermined range of positions of the piloting member, referred to as the "dead zone".

6. A control system according to claim 1, wherein the management unit renders the piloting member inoperative on the control for controlling movements of the at least one rotor when the current control margin is less than or equal to the predetermined control margin threshold, when the piloting member is moved over the predetermined range of positions of the piloting member, referred to as the "dead zone".

7. A control system according to claim 1, wherein the control system includes warning means suitable for generating a perceptible signal enabling the pilot of the rotorcraft to be informed that the current control margin is less than or equal to the predetermined control margin threshold.

8. A control system according to claim 7, wherein the perceptible signal is selected from the group comprising sound signals, luminous and/or visual signals, force signals opposing manual movement of the piloting member, and vibratory signals.

9. A control system according to claim 8, wherein the vibratory signals are generated by a vibrator secured to the piloting member.

10. A rotorcraft including at least one rotor providing the rotorcraft with lift and/or propulsion together with at least one piloting member suitable for operating at least one control for controlling movements of the at least one rotor, wherein the rotorcraft includes a control system according to claim 1.

11. A control system for controlling a main rotor of a rotorcraft, the control system comprising at least one piloting member suitable for operating at least one control for controlling movements of the main rotor, and further comprising:
    at least one memory enabling information representative of a predetermined control margin threshold to be stored;
    calculator for calculating a current control margin, which margin is defined as being the difference between a current position and a limit of the control for controlling movements of the main rotor;
    comparator for comparing the current control margin with the predetermined control margin threshold; and
    a control unit for modifying an operating relationship of the control for controlling movements of the main rotor when the current control margin is less than or equal to the predetermined control margin threshold;
    wherein the control system includes a management unit for managing the piloting member, the management unit enabling the piloting member to be made inoperative on the control for controlling movements of the main rotor when the current control margin is less than or equal to the predetermined control margin threshold, the piloting member being inoperative over a predetermined range of positions of the piloting member, referred to as a "dead zone".

12. A control system according to claim 11, wherein when the current control margin is less than or equal to the predetermined control margin threshold, the control unit adapts the operating relationship of the control for controlling movements of the main rotor so that a current position of the piloting member is made to be proportional to a current position of the control for controlling movements of the main rotor.

13. A control system according to claim 11, wherein the control system includes a warning generator suitable for generating a perceptible signal enabling the pilot of the rotorcraft to be informed that the current control margin is less than or equal to the predetermined control margin threshold.

14. A control system according to claim 13, wherein the perceptible signal is selected from the group comprising sound signals, luminous and/or visual signals, force signals opposing manual movement of the piloting member, and vibratory signals.

15. A rotorcraft including a main rotor providing the rotorcraft with lift and/or propulsion together with at least one piloting member suitable for operating at least one control for controlling movements of the main rotor, wherein the rotorcraft includes a control system according to claim 11.

16. A method for controlling at least one rotor of a rotorcraft by at least one piloting member suitable for operating at least one control for controlling movements of the at least one rotor, the method comprising the steps of:
    storing in a memory information representative of a predetermined control margin threshold;
    calculating a current control margin defined as being the difference between a current position and a limit of the at least one control for controlling movements of the at least one rotor;
    comparing the current control margin with the predetermined control margin threshold; and
    modifying an operating relationship of the control for controlling movements of the at least one rotor when the current control margin is less than or equal to the predetermined control margin threshold;
    wherein the step consisting in modifying the operating relationship of the control for controlling movements of the at least one rotor enables a sensitivity of the operating relationship of the control to be modified so as to make a current position of the piloting member proportional to a current position of the control for controlling movements of the at least one rotor;
    wherein the method includes a step of making the piloting member inoperative over the control for controlling movements of the at least one rotor when the current control margin is less than or equal to the predetermined control margin threshold, the piloting member being inoperative over a predetermined range of positions of the piloting member, referred to as a "dead zone".

17. A method according to claim 16, wherein the method includes a step of generating a perceptible signal enabling the pilot of the rotorcraft to be informed that the current control margin is less than or equal to the predetermined control margin threshold.

18. A method for controlling a main rotor of a rotorcraft by at least one piloting member suitable for operating at least one control for controlling movements of the main rotor, the method comprising the steps of:
    storing in a memory information representative of a predetermined control margin threshold;
    calculating a current control margin defined as being the difference between a current position and a limit of the at least one control for controlling movements of the main rotor;

comparing the current control margin with the predetermined control margin threshold; and modifying an operating relationship of the control for controlling movements of the main rotor when the current control margin is less than or equal to the predetermined control margin threshold;

wherein the method includes a step of making the piloting member inoperative over the control for controlling movements of the main rotor when the current control margin is less than or equal to the predetermined control margin threshold, the piloting member being inoperative over a predetermined range of positions of the piloting member, referred to as a "dead zone".

19. A method according to claim 18, wherein the step of modifying the operating relationship of the control for controlling movements of the main rotor is implemented by making a current position of the piloting member proportional to a current position of the control for controlling movements of the main rotor.

20. A method according to claim 18, wherein the method includes a step of generating a perceptible signal enabling the pilot of the rotorcraft to be informed that the current control margin is less than or equal to the predetermined control margin threshold.

* * * * *